United States Patent [19]
Hay

[11] 3,914,266
[45] Oct. 21, 1975

[54] COPPER COMPLEX
[75] Inventor: Allan S. Hay, Schenectady, N.Y.
[73] Assignee: General Electric Company, Schenectady, N.Y.
[22] Filed: Feb. 11, 1974
[21] Appl. No.: 441,296

[52] U.S. Cl............................ 260/438.1; 260/47 ET
[51] Int. Cl.² ........................................... C07F 1/08
[58] Field of Search ................................. 260/438.1

[56] References Cited
UNITED STATES PATENTS

| | | | |
|---|---|---|---|
| 2,686,798 | 8/1954 | Gmitter........................ | 260/438.1 X |
| 2,924,551 | 2/1960 | Harwood et al. ............ | 260/438.1 X |
| 2,924,552 | 2/1960 | Harwood et al. ............ | 260/438.1 X |
| 2,928,856 | 3/1960 | Harwood et al. ............. | 260/438.1 |
| 2,977,279 | 3/1961 | Kasmin ........................ | 260/438.1 X |
| 3,038,904 | 6/1962 | Godfrey ............................ | 260/268 |
| 3,254,126 | 5/1966 | Griffith et al. ....................... | 260/583 |

OTHER PUBLICATIONS

Meek et al., Inorg. Chemistry, Vol. 4, pp 584–587 (1965).
Hatfield, Inorg. Chemistry, Vol. 2, pp 629–632 (1963).
J.A.C.S. Vol. 76, pp 211–214 (1954).
Basolo et al. Chemical Abstracts, Vol. 69, 5979k (1968).
Basolo et al., J.A.C.S. Vol. 74, 5243–5246 (1952).

Primary Examiner—Helen M. S. Sneed
Attorney, Agent, or Firm—F. Wesley Turner; Joseph T. Cohen; Jerome C. Squillaro

[57] ABSTRACT

Cuprous bromide and cupric bromide form a 1 to 1 molar complex with N,N'-disubstituted alkylene or cycloalkylene diamines having from 2–3 carbon atoms between the two nitrogen atoms and whose two substituents on the two nitrogens are isopropyl or α-tertiary alkyl. These complexes have been found to have unique properties as catalysts in the oxidative coupling of phenols to polyphenylene oxides in solvent systems heretofore requiring removal of the water formed as a by-product during the reaction.

11 Claims, No Drawings

COPPER COMPLEX

This invention relates to new copper-amine complexes. More specifically, this invention relates to a unique family of 1 to 1 molar copper-amine complexes in which each member is a copper salt complex with a diamine in which the molar ratio is one mole of cuprous bromide or cupric bromide to one mole of a diamine having the formula:

R'HN—R—NHR', where R has at least two and no more than three carbon atoms separating the two nitrogen atoms and is $C_{2-4}$-alkylene or $C_{3-7}$-cycloalkylene and each R' is independently isopropyl or a $C_{4-8}$-tertiary alkyl group having no hydrogens on the $\alpha$-carbon atom.

Complexes of both cuprous and cupric salts with certain primary, secondary and tertiary amines are well-known catalysts for use in the process of oxidative coupling of phenols to polyphenylene oxide. Typical U.S. patents disclosing these catalysts and their use in this process are: U.S. Pat. Nos. 3,219,625, 3,219,626, 3,259,629 and 3,277,095-Blanchard et al., 3,306,874 and 3,306,875-Hay; 3,384,619-Tori, et al.; 3,639,656-Bennett et al,; and 3,642,699 and 3,661,848-Copper et al.; all of which are hereby incorporated by reference as a teaching of the process of oxidatively coupling phenols to polyphenylene oxides in which process the copper complexes of this invention have utility as catalysts.

In U.S. Pat. No. 3,306,875, I disclose that the tertiary polyamines which have only two or three aliphatic or cycloaliphatic carbon atoms separating the two tertiary amino nitrogens represent a class of polyamines which are superior to the other aliphatic tertiary amines in forming complexes with basic cupric salts which are formed from either cuprous or cupric salts. In marked contrast, I disclose in my U.S. Pat. No. 3,306,874 that the primary and secondary polyamines which have only two or three aliphatic or cycloaliphatic carbon atoms separating the two primary or secondary amino nitrogens represent a class of polyamines which are strong chelating agents and form complexes with copper salts which so completely envelop the copper that their copper complexes are less reactive catalysts than the copper complexes with other aliphatic primary or secondary mono- or polyamines in the oxidative coupling of 2,6-substituted phenols. As disclosed and claimed in my copending application Ser. No. 441,295, filed concurrently herewith, now abandoned, and refiled as Ser. No. 540,473 herewith and assigned to the same assignee as the present invention, I unexpectedly discovered that the copper salt complexes of the instant invention are an exception to this above-quoted teaching from U.S. Pat. 3,306,874. I have found that any one of the complexes of this invention is a necessary and critical component of a combination catalyst for the oxidative coupling of phenols to polyphenylene ethers that is so hydrolytically stable that is can be used without the necessity of removal of the water formed as a by-product in solvents formerly requiring means for such removal in order to avoid inactivation of the catalyst and consequent stopping of the oxidative coupling reaction. This exceptional property of the copper salt complexes of this invention sets them apart and distinguishes them as having a unique property not possessed by other copper salt complexes of other amines and especially the very closely related polyamines. It is believed that this unique property is directly attributable to the bulkiness of the substituents designated in the above formula by R'.

It was indeed surprising not only to find a limited class of amines that could be used amongst a broader class of diamines which had been found not to be useful in forming catalytically active complexes with copper salts, but also to find that the particular copper salt had to be the bromide, i.e. either cuprous bromide or cupric bromide that was used in forming the complex. Although the cupric chloride complexes are somewhat catalytically active, they are far inferior to the corresponding bromide complex. However, as discussed more fully in my copending application Ser. No. 441295 by use of an excess of soluble source of bromide ion, the cupric chloride complexes in effect become the cupric bromide complexes. Apparently, the bromide ion associated with the copper complex participates in some manner in providing the catalytic activity. Therefore, although these particular diamines will form complexes with other cuprous and cupric salts, these complexes do not have the same utility and catalytic properties as are possessed by the cuprous and cupric bromide complexes.

The particular diamines corresponding to the above formula broadly need to meet only one requirement, i.e., that there be at least two and no more than three carbon atoms separating the two amino nitrogen groups and that these carbon atoms to which the amino nitrogens are attached be aliphatic. Preferably, there are only two carbon atoms separating the two amino nitrogens, i.e. the two amino nitrogens are on adjacent carbon atoms. These two or three carbon atoms separating the amino nitrogens can be either acyclic or cyclic alkyl carbon atoms. Where substituents on these acyclic carbon atoms or the ring configurations of the cyclic alkyl groups are such that stereoisomers exist, any of the possible isomers can be used. However, the preferred structure will be that which provides for the stronger complexing of the cuprous or cupric bromide.

The balance of the molecule making up the diamine has little influence either on the complexing of the copper salt or in catalyzing the oxidative coupling reaction. Since any substituents would have to be nonreactive with amine nitrogen groups, be oxidatively stable during the oxidative coupling reaction in which they are part of the catalyst, and be nonreactive with either the phenol starting material or the polyphenylene oxide products, I prefer that the balance of the molecule be saturated aliphatic, either acyclic or cyclic, including aryl substituted saturated aliphatic or aryl, preferably phenyl or lower alkyl substituted phenyl. Typical examples therefore, which R can be, are ethylene, 1,2- or 1,3-propylene, 1,2-, 1,3- or 2,3-butylene, the various pentylene isomers having from 2–3 carbon atoms separating the two free valences, phenylethylene, tolylethylene, 2-phenyl-1,2-propylene, cyclohexylethylene, 1,2- or 1,3-cyclohexylene, 1,2-cyclopropylene, 1,2-cyclobutylene, 1,2-cyclopentylene, etc.

Because the increased length of the carbon chain of the R moiety does not increase the catalytic activity of the copper salt complex in the oxidative coupling reaction, does not increase the ability of the amine to complex the copper salt and increases the amount of amine which must be used to provide a particular molar amount, I prefer to use those diamines represented by the above general formula wherein R is C$_{2-4}$-alkylene or C$_{3-7}$-cycloalkylene with the two amino groups attached in such a way that there is at least two and no more than three carbon atoms separating the two nitrogen atoms, numerous examples of which are given above.

Both because diamines having the two amino groups attached to adjacent carbon atoms are readily prepared from olefins by chlorination or bromination followed by reaction with the desired amine and because such diamines are strong complexing agents for the copper salt, I prefer the above-described diamines in which there are only two carbon atoms separating the two nitrogen atoms. The most readily available, cheapest and therefore the most preferred embodiment would be where R is ethylene, i.e., —CH$_2$—CH$_2$—.

As mentioned above, each R' must be isopropyl or an α-tertiary alkyl group, i.e., is a tertiary alkyl or cycloalkyl group having no hydrogens on the α-carbon atom. The substitutents on the α-carbon atom making up the balance of the tertiary alkyl group can be straight or branched chain alkyl, cycloalkyl, aryl, alkaryl or aralkyl. The simplest such α-tertiary alkyl group is t-butyl. As the number of carbon atoms in the tertiary alkyl group of the amine increases, there is some loss in catalytic activity of its copper salt complex to catalyze the oxidative coupling reaction. By the time the tertiary alkyl group of the amine is the t-octyl group

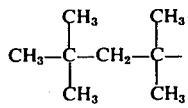

having two quaternary carbon atoms, the copper complex of the amine has become substantially less active. Therefore, I prefer that these α-tertiary alkyl groups have no more than eight carbon atoms and no more than one quaternary carbon atom, i.e., only one carbon atom having no hydrogen. They can be described as C$_{4-8}$-tertiary alkyl groups in which only the α-carbon atom has no hydrogen. Typical examples of such groups which R' may be are: t-butyl, 2-methylbut-2-yl, 2-cyclohexylprop-2-yl, 2-methylpent-2-yl, 3-methylpent-3-yl, 2,3-dimethylbut-2-yl, 2-methylhex-2-yl, 3-methylhex-3-yl, 3-ethylbut-3-yl, 2,3- and 2,4-dimethylpent-2-yl, 2-methylhept-2-yl, 3-methylhept-3-yl, 4-methylhept-4-yl, 3-ethylhex-3-yl, cumyl (2,2-dimethylbenzyl), etc. In addition to the above-mentioned acyclic alkyl groups, they can be cycloalkyl groups, for example, 1-methylcyclopentyl, 1-methylcyclohexyl, etc.

The copper salt complexes are readily prepared from the copper salt and the appropriate diamine. In the case of the cupric bromide complexes, cupric bromide is readily soluble in methanol or ethanol and upon addition of the diamine to the alcoholic solution of the cupric bromide, the cupric bromide complex precipitates from solution and is readily filtered off.

In the case of the cuprous bromide complexes, cuprous bromide is not very soluble in inert solvents. Acetonitrile dissolves it to the extent of 3.86 g./100 ml. at 18° C., probably as a weak complex, so it is the most convenient solvent to use. Shaking a mixture of the diamine and acetonitrile in the presence of the solid cuprous bromide will slowly form the desired complex but heating the solution up to reflux temperature will hasten the reaction. A convenient way to insure that there is no uncomplexed cuprous bromide is to place the cuprous salt in the extraction thimble of a Soxhlet apparatus and use a mixture of acetonitrile and the appropriate diamine in the reboiler section. On heating, acetonitrile refluxes up and forms a soluble complex with the cuprous bromide which, upon returning to the reboiler section, precipitates the insoluble complex of the cuprous bromide and the diamine. Other extractants other than acetonitrile could be used but, of course, must have a lower boiling point than the diamine and must form a less stable complex with the cuprous bromide than does the diamine.

In order that those skilled in the art may readily understand my invention, the following examples are given by weight of illustration and not by way of limitation. In all the examples, temperatures are in degrees centigrade and where analytical results are given, the determined values are followed by the calculated values in parentheses.

EXAMPLE 1

After dissolving two grams of cupric bromide in 75 ml. of warm methanol, 1.403 g. of N,N'-di-t-butylethylenediamine dissolved in 5 ml. of methanol was added drop-wise over a period of three minutes with stirring. A red, crystalline product precipitated and was filtered from the warm solution and washed twice with ether and dried under vacuum. There was obtained 3.0 g. (88%) of a 1:1 molar complex of cupric bromide with the diamine. Elemental analyses showed: C, 30.30 (30.36); H, 6.0 (6.11); N, 6.6 (7.08); Cu, 16.2 (16.06); Br, 42.8 (40.39). M.P. 158°–159°.

EXAMPLE 2

A Soxhlet extractor was assembled with 7.15 g. of cuprous bromide in the extraction thimble and a mixture of 12.9 g. (50% molar excess) of N,N'-di-t-butylethylenediamine and 100 ml. of acetonitrile was placed in the reboiler section. The liquid was refluxed for four hours and the solution cooled with ice and filtered. The product was washed well with pentane and dried under vacuum at room temperature. There was obtained 14.7 g. (93%) of the 1:1 molar complex of cuprous bromide with the diamine as an off-white crystalline solid. Elemental analyses showed: C, 38.2 (38.04); H, 7.6 (7.66); N, 8.9 (8.87); Br, 25.1 (25.31). M.P. 231°–233° (dec.).

EXAMPLE 3

Under a nitrogen atmosphere, 2.2 g. of N,N'-di-t-amylethylenediamine was added dropwise to a boiling solution of 2.23 g. of cupric bromide in 22 ml. of methanol. The cupric diamine complex began to precipitate from the solution before the addition of the diamine was completed. After the addition was complete, the reaction mixture was cooled to room temperature and the 1:1 molar complex of cupric bromide and the diamine was filtered from the solution, washed with methanol, diethylether and dried in a vacuum at 50°. Elemental analyses showed: C, 34.0 (34.02); H, 6.7 (6.66); N, 6.8 (6.61); Cu, 15.0 (15.00); Br, 37.7 (37.72). M.P. 133.5 – 134°.

EXAMPLE 4

When Example 3 was repeated, but using the equivalent amount of N,N'-diisopropylethylenediamine in place of the N,N'-di-t-amylethylenediamine, there was obtained the 1:1 molar complex of cupric bromide with the diamine. Elemental analyses showed: C, 26.4 (26.14); H, 5.5 (5.48); N, 7.6 (7.62); Cu, 17.4 (17.28); Br, 43.2 (43.47). M.P. 235°.

The complexes of this invention, as disclosed hereinbefore are extremely active catalysts for the oxidative coupling of phenols. They can be used per se as the copper-amine complex which is used as the oxygen carrying intermediate in the oxidative coupling reaction whereby an oxygen containing gas is brought in contact with a solution of the phenol and the copper-amine complex, generally at room temperature, thereby converting the phenol to the corresponding polyphenylene oxide. However, a much more active catalyst is obtained when the copper-amine complexes of the present invention are used in conjunction with added bromide ion, preferably an alkali metal bromide, bromine itself, hydrogen bromide, or the para-bromo-isomer of the phenol which is oxidatively coupled, and a low molecular weight tertiary amine, preferably a tri-(lower alkyl) amine. Such a combination is an extremely active catalyst for the oxidative coupling reaction and permits phenol to copper ion ratios of 750 to 1,400 to be used.

The examples set out hereinbefore have illustrated the best mode of producing the copper complexes of this invention. By using any of the other disclosed diamines in place of the particular diamines used in the examples and/or by using cuprous bromide in place of the cupric bromide or vice versa, the other cupric and cuprous bromide complexes of this invention are also readily prepared in accordance with the mode of the examples.

Several modifications and variations of the invention have been illustrated in the above examples and elsewhere in the disclosure. Accordingly, other modifications and variations will be readily apparent to those skilled in the art in view of applicant's teaching. It is, therefore, to be understood that changes may be made in the particular embodiments of the invention described herein which changes are within the full intended scope of the invention as defined by the appended claims.

I claim:

1. A crystalline, copper salt complex with an amine wherein the molar ratio is one mole of copper salt to one mole of amine, the copper salt is cuprous bromide or cupric bromide and the amine has the formula:

$$R'HN—R—NHR',$$

where R is $C_{2-4}$-alkylene or $C_{3-7}$-cycloalkylene and each R' is independently isopropyl, a $C_{4-8}$-tertiary alkyl or cycloalkyl group in which the α-carbon atom has no hydrogens, there being at least two and no more than three carbon atoms separating the two nitrogen atoms.

2. A composition in accordance with claim 1, wherein each R' is independently isopropyl, a $C_{4-8}$-tertiary alkyl or cyclo-alkyl group in which only the α-carbon atom has no hydrogens, there being at least two and no more than three carbon atoms separating the two nitrogen atoms.

3. The complex of claim 2, wherein R is 1,2-alkylene or 1,2-cycloalkylene and each R' is tertiary alkyl.

4. The complex of claim 3, wherein R is 1,2-alkylene.

5. The complex of claim 2, wherein each R' is tertiary butyl.

6. The complex of claim 2, wherein the copper salt is cupric bromide.

7. The complex of claim 6, wherein R is 1,2-alkylene and each R' is tertiary butyl.

8. The complex of claim 6, wherein R is ethylene and each R' is tertiary butyl.

9. The complex of claim 2, wherein the copper salt is cuprous bromide.

10. The complex of claim 9, wherein R is 1,2-alkylene and each R' is tertiary butyl.

11. The complex of claim 9, wherein R is ethylene and each R' is tertiary butyl.

* * * * *